(12) United States Patent
Brown et al.

(10) Patent No.: US 10,518,360 B2
(45) Date of Patent: Dec. 31, 2019

(54) LASER ENCLOSURE

(71) Applicant: ILLINOIS TOOL WORKS INC., Glenview, IL (US)

(72) Inventors: Robert Brown, Darlington, SC (US); William R. Giese, Monee, IL (US); Erik Miller, Verona, WI (US)

(73) Assignee: Illinois Tool Works Inc., Glenview, IL (US)

(*) Notice: Subject to any disclaimer, the term of this patent is extended or adjusted under 35 U.S.C. 154(b) by 547 days.

(21) Appl. No.: 14/986,832

(22) Filed: Jan. 4, 2016

(65) Prior Publication Data

US 2017/0190001 A1 Jul. 6, 2017

(51) Int. Cl.
*B23K 26/70* (2014.01)
*B23Q 11/08* (2006.01)
*F16P 3/02* (2006.01)
*F16P 1/06* (2006.01)

(52) U.S. Cl.
CPC ........ *B23K 26/706* (2015.10); *B23Q 11/0891* (2013.01); *F16P 1/06* (2013.01); *F16P 3/02* (2013.01)

(58) Field of Classification Search
CPC ........... B23Q 11/0891; F16P 1/06; F16P 3/02; B23K 26/706
USPC .............. 219/121.82, 121.86; 108/106; 250/506.1, 515.1; 110/173 C; 49/116–118, 120, 366–368, 370
See application file for complete search history.

(56) References Cited

U.S. PATENT DOCUMENTS

| | | |
|---|---|---|
| 4,205,216 A | 5/1980 | Douglas |
| 5,464,963 A | 11/1995 | Hostler et al. |
| 5,643,477 A | 7/1997 | Gullo et al. |
| 5,658,476 A | 8/1997 | Gullo et al. |
| 5,921,459 A | 7/1999 | Heraly et al. |
| 6,147,323 A | 11/2000 | Erickson et al. |
| 6,314,686 B1 | 11/2001 | Scherer et al. |
| 6,621,091 B2 | 9/2003 | Pratt et al. |
| 6,649,868 B2 | 11/2003 | Pratt et al. |
| 6,686,560 B2 | 2/2004 | Pratt et al. |
| 8,338,751 B2 | 12/2012 | Larkins |
| 2013/0326965 A1 | 12/2013 | Darzi |
| 2015/0273641 A1 | 10/2015 | Mabee |

FOREIGN PATENT DOCUMENTS

| | | |
|---|---|---|
| DE | 102012216632 | 3/2014 |
| WO | 2004108343 | 12/2004 |

OTHER PUBLICATIONS

Machine Translation, Trumpf Laser GmbH & Co. KG, DE 102012216632.*
European Search Report for Appln. No. 16200146.5-1702 dated May 11, 2017 (7 pages).

* cited by examiner

*Primary Examiner* — Dana Ross
*Assistant Examiner* — James F Sims, III
(74) *Attorney, Agent, or Firm* — McAndrews, Held & Malloy, Ltd.

(57) ABSTRACT

An enclosure for a laser in which on side of the enclosure includes a rotatable positioner and a vertically slidable door movable between open and closed positions. With the door in the open position, the positioner is free to rotate, thereby enabling an workstation to rotate into and out of the enclosure.

19 Claims, 6 Drawing Sheets

LASER ENCLOSURE

BACKGROUND

The present disclosure generally relates to laser material processing. More specifically, the disclosure relates to laser beam containment means and methods.

Lasers and laser systems are generally divided into four major classifications according to their potential to cause biological damage to the eye or skin. One such classification system is established by the American National Standards Institute, commonly referred to as ANSI. The classification standards are known as the ANSI Z136 standards.

The purpose of these classifications is to warn users of the hazards associated with the laser relative to the accessible emission limits. These limits are based on laser output energy or power, radiation wavelengths, exposure duration, and cross-sectional area of the laser beam at the point of interest.

Referring to the ANSI classifications, a classification of 1 means that a laser is safe under all conditions of normal use. This means the maximum permissible exposure (MPE) cannot be exceeded when viewing a laser with the naked eye or with the aid of typical magnifying optics (e.g. telescope or microscope). A class 1 laser cannot emit laser radiation at known hazard levels (typically continuous wave: CW 0.4 µW at visible wavelengths). Users of Class I laser products are generally exempt from radiation hazard controls during operation and maintenance (but not necessarily during service). Since lasers are not classified on beam access during service, most Class I industrial lasers will consist of a higher class (high power) laser enclosed in a properly interlocked and labeled protective enclosure. In some cases, the enclosure may be a room (walk-in protective housing) which requires a means to prevent operation when operators are inside the room.

Most lasers used for material processing are Class 4 lasers. A class 4 laser is the highest and most dangerous class of laser, including all lasers that exceed the Class 3B AEL. By definition, a Class 4 laser can burn the skin, or cause devastating and permanent eye damage as a result of direct, diffuse or indirect beam viewing.

A Class 4 laser can be installed in a workcell that is certified as a Class 1 enclosure. However, a Class 1 enclosure must guarantee that the light emitted from the Class 4 laser stays within the enclosure or is safe outside of the enclosure under all conditions of normal use.

SUMMARY

The present disclosure provides one or more inventions relating to a workcell for a Class 4 laser compliant with Class 1 enclosure requirements.

In an embodiment, the disclosure provides an enclosure with one side comprising: at least one vertically sliding door movable between open and closed positions and having a first edge; a positioner rotatable around a vertical axis; and a wall member carried on the positioner, the wall member also having a second edge, wherein, the wall member is rotatable with the positioner from parallel to a plane of the vertically sliding door to out of the plane, and the edges of the vertically sliding door and the wall member having mating profiles.

In an embodiment, the enclosure is rated Class 1 per the laser enclosure standards of the American National Standards Institute.

In an embodiment, the enclosure further comprises a flange extending along a plane of either the wall member or the vertically sliding door and from an edge of the wall member or the vertically sliding door, respectively, so as to at least define an L-shaped channel, wherein, when the vertically sliding door is in the closed position, the edge of the vertically sliding door or the edge of the wall member, respectively, is received within the L-shaped channel and the flange overlaps any gap between the edges of the vertically sliding door and the wall member.

In an embodiment, the flange extends along a plane of the wall member and from an edge of the wall member.

In an embodiment, the flange extends along a plane of the vertically sliding door and from an edge of the vertically sliding door.

In an embodiment, the enclosure comprises two flanges, each extending from an edge and along respective planes of opposites sides of the wall member or the vertically sliding door so as to define a C-shaped channel into which the edge of the vertically sliding door or the wall member, respectively is received, the flanges covering any gap between the edges.

In an embodiment, the enclosure is Class 1 compliant as defined in the ANSI Z136 standards.

In an embodiment, the enclosure further comprises two work stations positioned on opposite sides of the wall member.

In an embodiment, the enclosure further comprises laser light shield panels extending from vertical edges of the one side of the enclosure.

In an embodiment, the positioner wall member is movable in the vertical direction between raised and lowered positions, with the wall member being rotatable about the vertical axis in the raised position and with the vertically sliding door in the open position.

In an embodiment, the enclosure comprises upper and lower vertically sliding doors, each movable between an open position and a closed position, wherein: the flange extends from an edge of the wall member and is continuous about an periphery of the wall member and defines a continuous L-shaped channel about the periphery of the wall member, edges of both the upper and lower vertically sliding doors are received within the L-shaped channel when they are in the closed position, and the flange overlaps any gap between the edges of the upper and lower vertically sliding doors and the edge of the wall member.

These and other aspects of the embodiments are set forth below in the detailed description with reference to the accompanying drawings.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

DETAILED DESCRIPTION

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the present disclosure.

Figure 1:
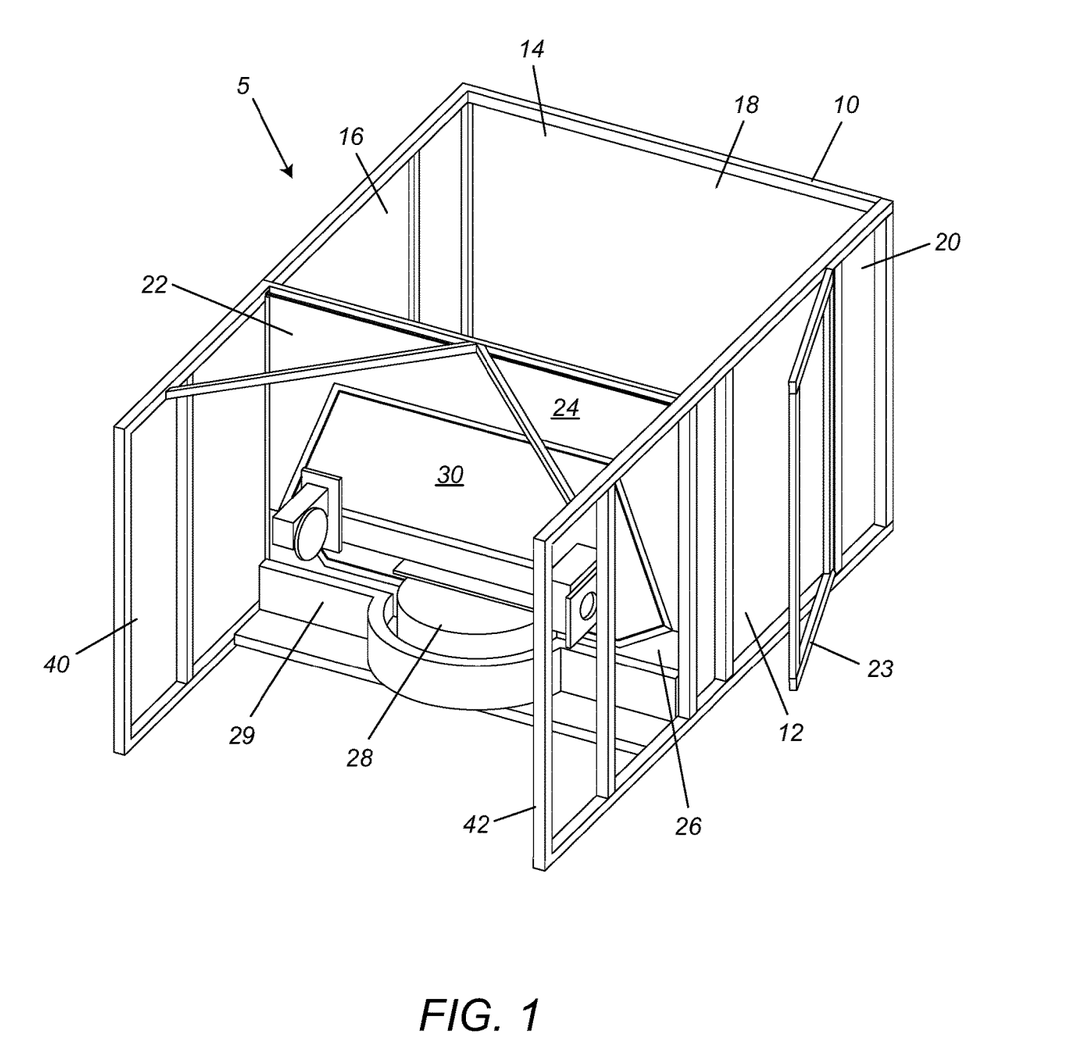
FIG. 1 is a perspective view of a laser enclosure embodying principles disclosed herein.

In FIG. 1, there is illustrated in perspective view a workcell 5 with an enclosure 10 embodying principles disclosed herein. The enclosure 10 includes a floor 12, a roof 14 and three sides 16, 18 and 20 constructed in accordance with known Class 1 enclosure materials and structure. The enclosure 10 also includes a fourth side 22 constructed in accordance with principles disclosed herein.

As such, the enclosure 10 includes an enclosed or interior space 5A defined by the floor 12, roof 14 and sides 16, 18, 20 and 22. In this interior space 5A can be utilized any laser, including a Class 4 laser, while still meeting Class 1 requirements, at least with respect to outside of the interior space.

The enclosure 10 can also include a door 23, made in accordance with Class 1 requirements to provide access to the interior processing space 5A.

As illustrated, the fourth side 22 includes two vertically movable doors, an upper door 24 and a lower door 26. As described later, the doors 24 and 26 are movable between open and closed positions. As further described below, the lower door 26 preferably has two independent door halves 26a and 26b, which are mirror images of each other. Because the door halves 26a and 26b move in tandem and effectively operate as one door, reference herein will be made to them as the lower door 26 except where a distinction is noted. In FIG. 1, the doors 24 and 26 are illustrated in the close position.

A positioner 28 includes a wall member 30 designed to mate with the doors 24 and 26 so that when the doors 24 and 26 are in the closed position, the doors 24 and 26 and the wall member 30 provide a sealed wall at the fourth side 22.

Blocking plates or walls 29 are positioned on opposite sides of a base of the positioner 28. Only one blocking plate or wall 29 is illustrated, the other preferably being similar. The blocking plates or walls 29 server to block light that might escape under the lower door 26 when the door 26 is raised in the closed position, as will become more evident below.

Figure 2:
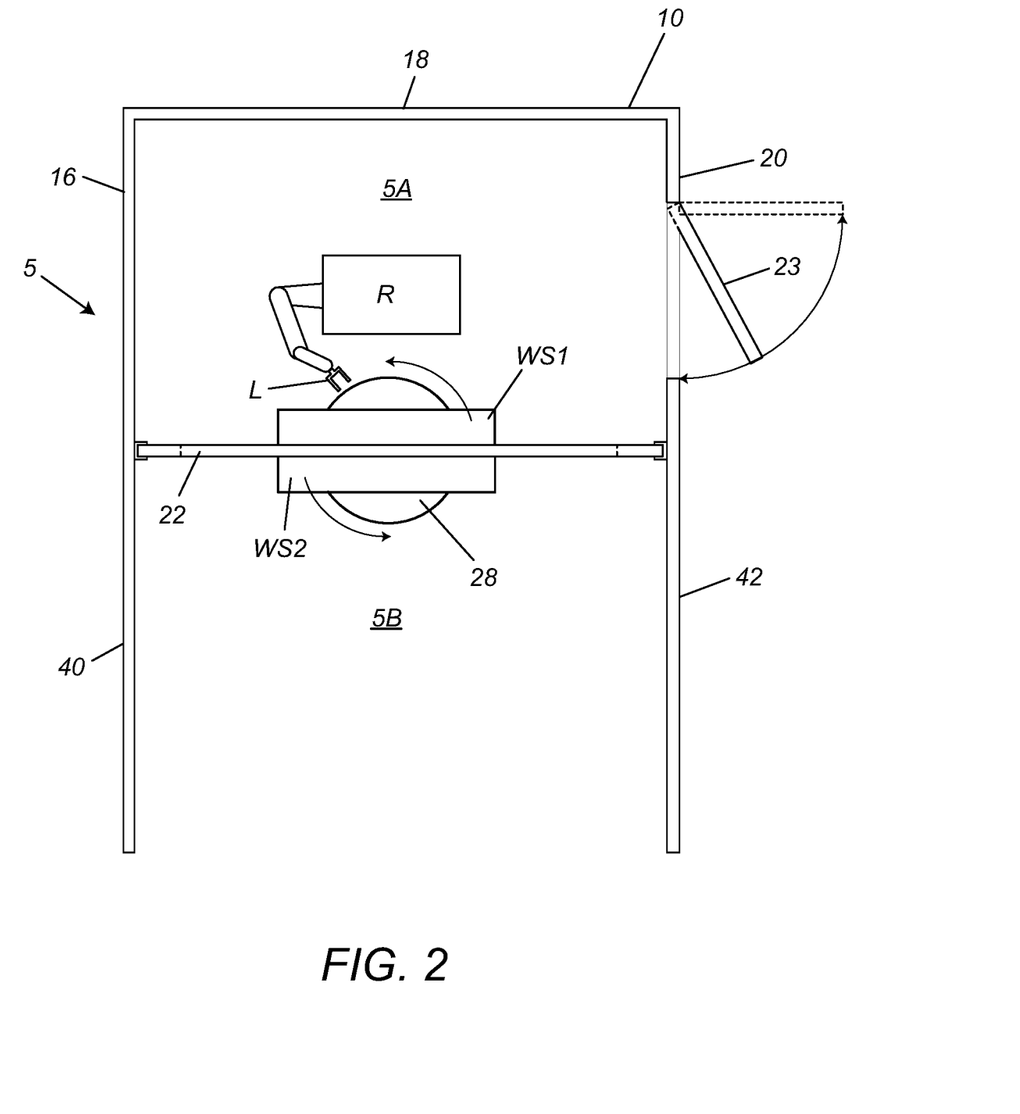
FIG. 2 is a plan outline view of the laser enclosure of FIG. 1.

In FIG. 2, the enclosure is shown in outline plan view. As can be seen, the positioner 28 carries two work stations WS1 and WS2 on opposite sides of the wall member 30. A robot R with a laser L is positioned in the processing space 5A.

The workstations WS1 and WS2 can be identical, but need not be. Further, a workstation can be any suitable workstation. An exemplary workstation can include a horizontal platform and one or more fixtures for holding one or workpieces to be processed.

As can be seen, when the wall member 30 is in the plane of the wall 22, one of the workstations is in the processing space 5A and faces the robot R and another is in a loading/unloading space 5B described later.

Figure 3:
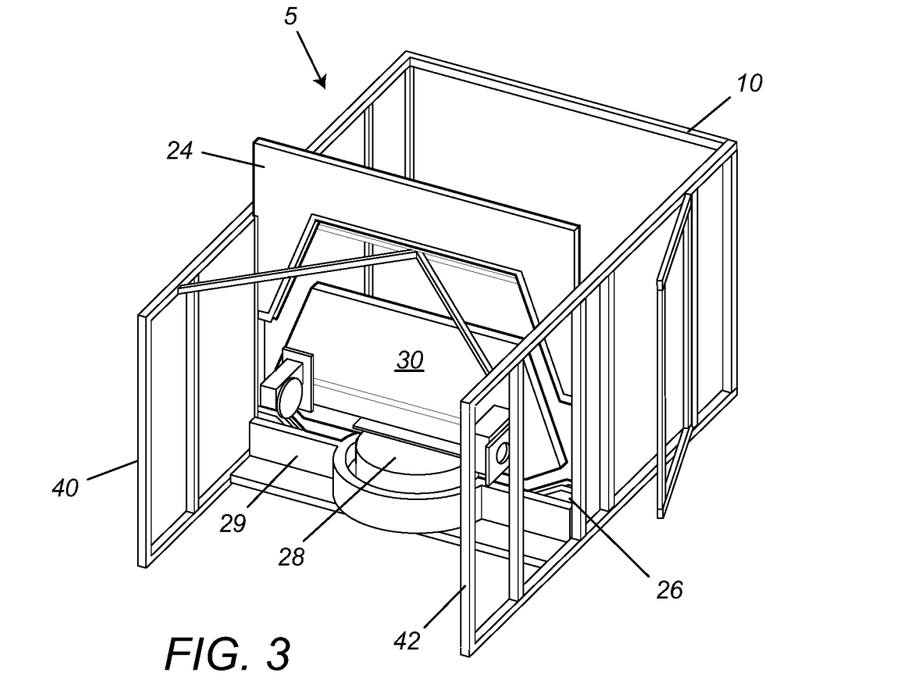
FIG. 3 is a perspective view of the laser enclosure of FIG. 1 with movable doors open.
Figure 4:
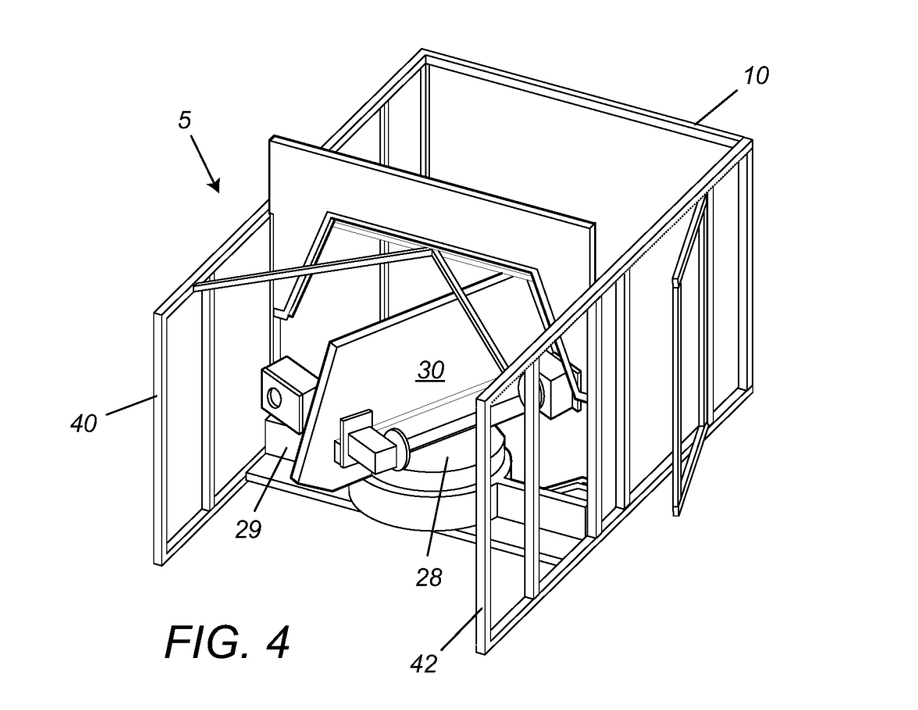
FIG. 4 is a perspective view of the laser enclosure of FIG. 1 with a positioner in partially rotated position.

In FIGS. 3 and 4, the enclosure 10 is illustrated with the doors 24 and 26 in the open position. As illustrated, when the doors 24 and 26 are moved to the open position, with the lower door 26 moved vertically downward and the upper door 24 moved vertically upward, the wall member 30 is separated from the doors. In FIGS. 3 and 4, it can be seen that with this separation, the positioner 28 is free to rotate with the wall member 30 free to rotate therewith as such movement is not impeded by the doors 24 and 26.

As illustrated, when the doors 24 and 26 are in the closed position, the wall member 30 is stopped in a position in or parallel to the plane of the fourth side 22 so that the doors 24 and 26 mate therewith, and together they present a sealed wall at the fourth side 22 of the enclosure 10, further details about which are provided below.

The workcell 5 further includes physical barrier side panels 40 and 42 that extend from opposite vertical edges of the enclosure 10. These panels 40 and 42 provide protection along sides of the point of load/unload 5B.

As can be appreciated, the workcell 5 can be used in a laser production operation and has the point of load/unload 5B for an operator in the space encompassed by the physical barrier panels 40 and 42 and the processing space 5A within the enclosure 10. The workcell 5 is designed so that the operator stands in front of the positioner at the load/unload point 5B.

The positioner includes two work stations 32 that are 180 degrees apart on the wall member 30, that is, they are on opposite sides of the wall member 30. While a robot (not illustrated) processes a part previously loaded in a first station using a suitable laser (not illustrated), the operator can remove a finished part from the second station or load/unload point 5B or load a new part into the second work station.

In operation, it is preferred that after unloading a part from or loading a part onto whatever work station is exposed in the load/unload point, the operator steps out of the light curtain-protected area and presses a start button. Then the robotic laser processes a part loaded onto the work station that is within the enclosed space 5A. When the robot completes processing of the part within the enclosure, the positioner rotates 180 degrees, placing the other workstation 32 with the newly loaded part before the robot and workstation with the processed part within the load/unload point. At this time, the operator returns to swap the processed part for another part to be processed, and the foregoing process can be repeated.

Thus, it can be appreciated that the positioner has at least two defined states. One state is a operational state when the positioner wall member 30 is parallel to the fourth side of the enclosure and one workstation is in the load/unload position and the other workstation is in the processing position. The other state is a transition state when the positioner is in any other rotated position and the edges or periphery of the wall member 30 cannot be effectively sealed.

Figure 5:
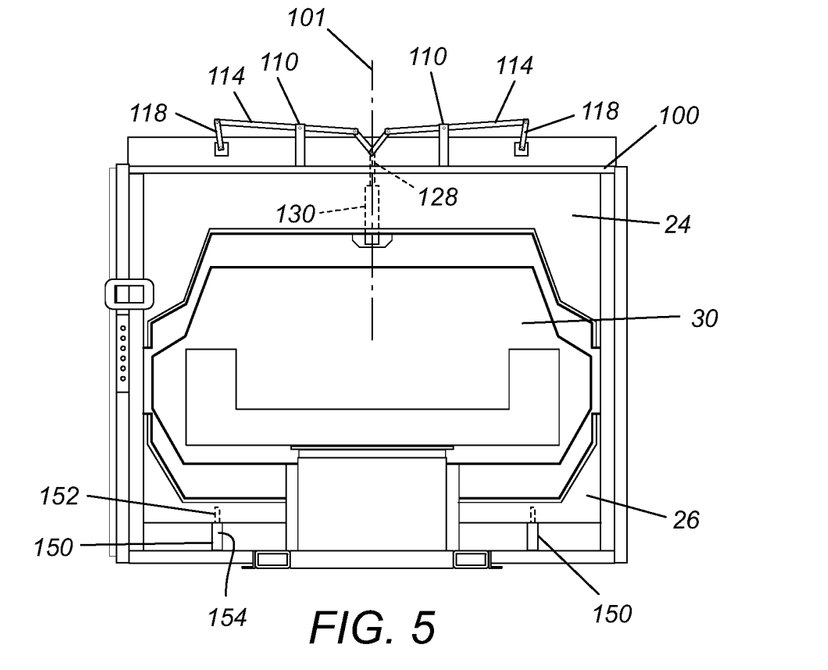
FIG. 5 is an elevation view of the laser enclosure of FIG. 1 with open enclosure doors.
Figure 6:
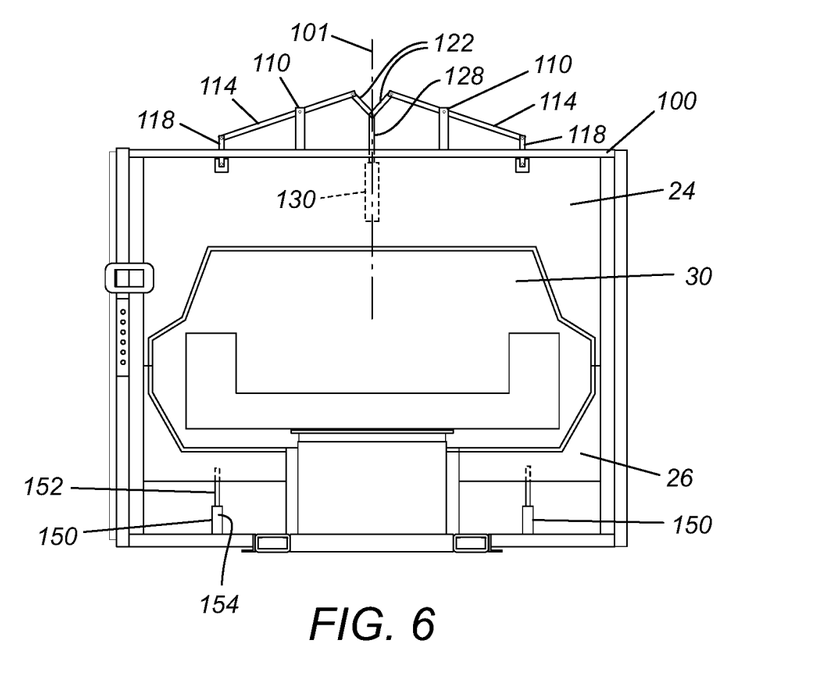
FIG. 6 is an elevation view of the laser enclosure of FIG. 1 with closed enclosure doors.

In FIGS. 5 and 6, the enclosure 10 is shown in elevation with the doors 24 and 26 in the open and closed positions, respectively. The light block plate or wall 29 is omitted for ease of understanding. However, the mechanisms for moving the doors up and down are also depicted, these are explained in more detail below.

Figure 7:
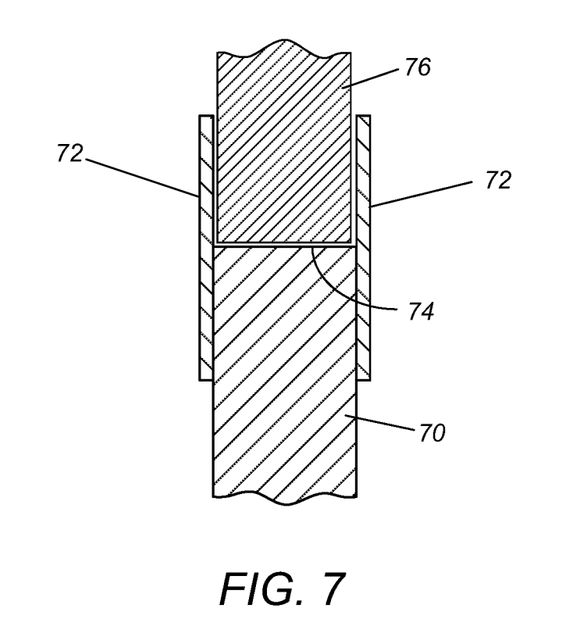
FIG. 7 is a partial cross section view of a rotating wall for the positioner or one of the movable doors of the enclosure of FIG. 1.

In FIG. 7, a profile of a portion of a wall member 70 is illustrated. This wall member 70 is representative of either the upper movable door 24 or the lower movable door 26. Alternatively, it is representative of the wall member 30 of the positioner.

As can be seen, preferably the wall member 70 includes flanges 72 that extend from and parallel to the planes of opposite sides of the wall member 70. The flanges 72 extend beyond an edge 74 of the wall member 70. The flanges 72 and edge 74 thus define a U-shaped or C-shaped channel in cross section into which can be received an edge portion of another wall member 76. The edge portion 76 represents an edge portion of the positioner wall member 30 if the wall member 70 represents either the upper movable door 24 or the lower movable door 26. Alternatively, the edge portion 76 represents an edge portion of either the upper movable door 24 or the lower movable door 26 if the wall member 70 represents an edge portion of the positioner wall member 30. As can be seen, the flanges 72 overlap the gap between the wall member 70 and the edge portion 76, thereby blocking any light from escaping from the workspace.

Preferably, the U-shaped channel extends along the entire periphery of the wall member 70 that faces the edge portion 76. Thus, when both doors 24 and 26 are in the closed position, the flanges cover every gap between both doors and the positioner wall member 30.

Figure 8:
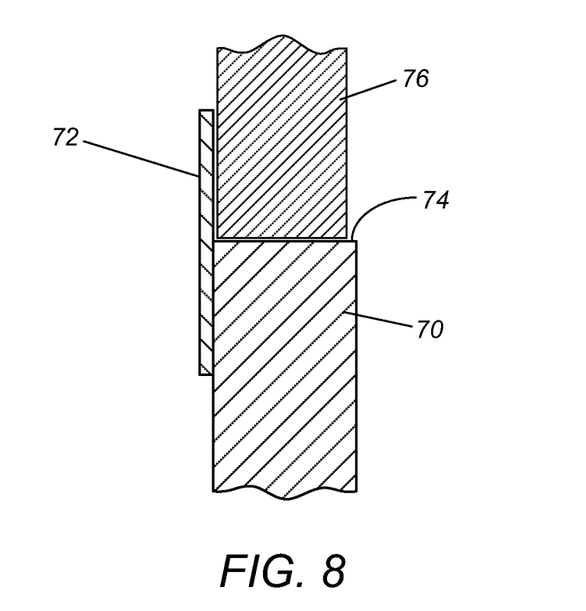
FIG. 8 is a partial cross section view of a portion of the rotating wall for the positioner or one of the movable doors of the enclosure of FIG. 1.

Alternatively, as shown in FIG. 8, the wall member 70 can include only one flange 72 extending from one side of the wall member and from the edge 74, so as to form an L-shaped channel with the edge 74. As can be appreciated, with this profile, the flange will overlap only gaps between the positioner wall member 30 and the vertically sliding doors 24 and 26 on one side of the wall member 70.

Figure 9:
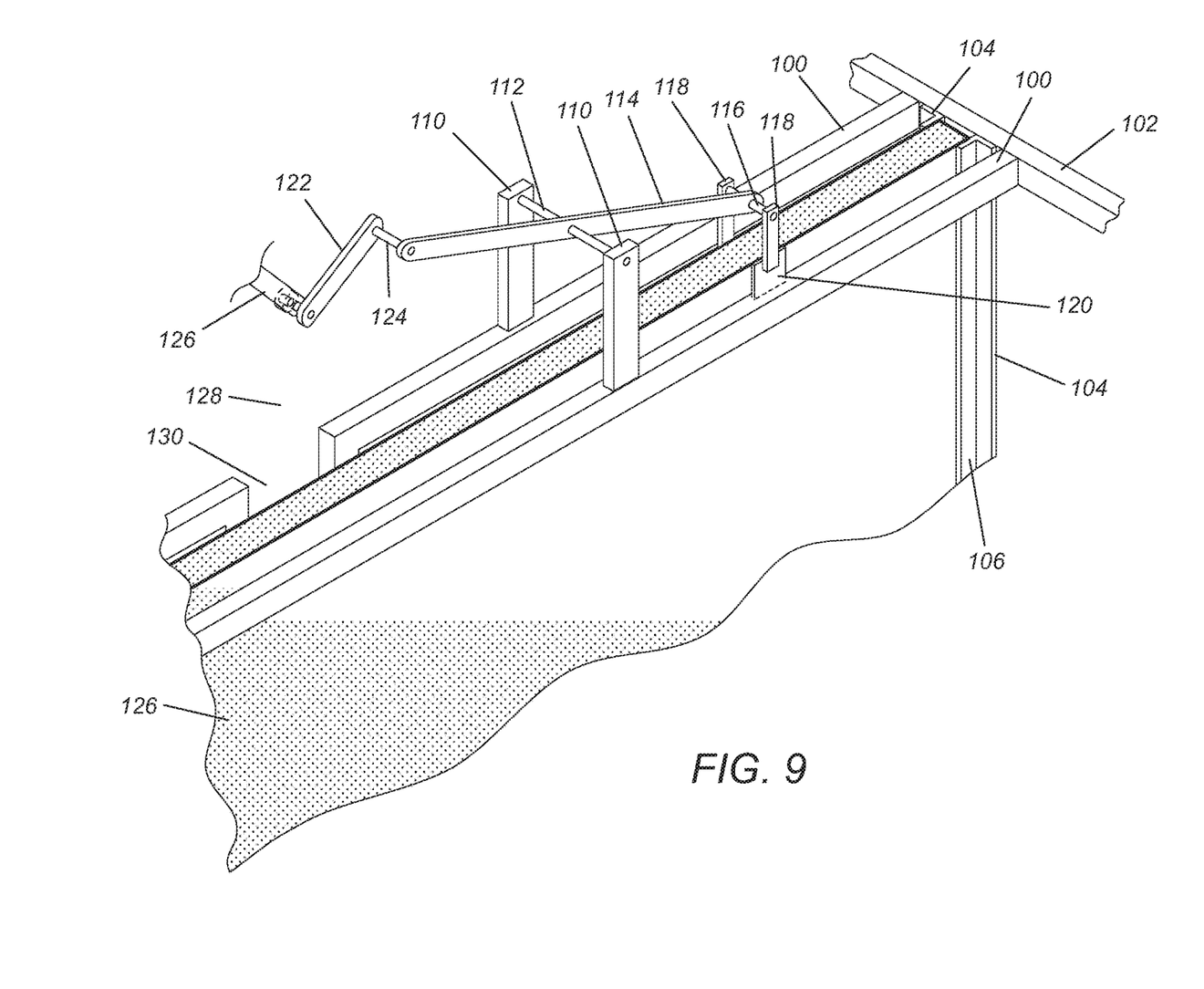
FIG. 9 is a detail view of a lift system for one of the movable doors of the enclosure of FIG. 1.

In FIGS. 5, 6, and 9, it is shown that, preferably, the vertically sliding doors are moved by means of pneumatically actuated lifting systems. Again, the light block plate or wall 29 is omitted for ease of understanding.

In FIG. 9, the top of the upper door 24 and one-half of its associated pneumatically actuated lifting system is shown in perspective view. The pneumatically actuated lifting system comprises a set of pivotally connected arms and brackets so that the arms can pivot about the pivot points as they raise or lower the upper door 24.

To that end, the pneumatically actuated lifting system comprises a pair of parallel horizontal support beams 100 supported slightly above a horizontal line defining a top of the top vertically sliding door 24 when in its closed position. The horizontal support beams are secured to and supported at opposite ends by beams 102 which are supported by vertical beams 104 which flank side edges of the doors 24 and 26. The beams 104 preferably have a vertically extending flange 106 that seals side edges of the doors 24 and 26. As can be seen, preferably, both beams 104 have the vertically extending flange 106 so that the door edges are sealed on both sides to prevent the escape of laser light from within the work area. To that end, the flanges 106 can be flanges of an 80/20® double flange linear bearing which includes linear bearing strips within which the vertical edges of the doors 24 and 26 ride. 80/20® double flange linear bearings have T-slot profiles, are well known, and are commercially available from 80/20 Inc. While the double flange linear bearing can be a stand alone beam 104, it can also be in addition and attached to another vertical beam.

As best seen in FIGS. 5 and 6, the support beam 100 carries two mirrored leverage systems located at opposite sides of a centerline 108 of the door 24.

Referring again to all of FIGS. 5, 6, and 9, each of the two leverage systems includes two vertically extending brackets 110, each located at opposite sides of the centerline of the door 24 and on a respective horizontal support beam 100. The brackets 110 are aligned and support opposite ends of an axle 112 between them. The axle 112 serves as a pivot point. To that end, the axle 112 extends through and carries an arm 114 so that the arm 114v pivots about the axle 112.

A first end of each arm 114 is attached to another axle 116 which also serves as another pivot point. The axel 116 is carried at opposite ends by two brackets 118 which are located at and secured at the top edge of the door 24. Preferably, as illustrated, the brackets 118 are secured to tabs 120 which are themselves secured to the door 26 at the top edge of the door 26.

A second end of the each arm 114 is attached to one end of a connector 122 by way of an axle 124. One end of the axle 124 is pivotally secured to the second end of the arm 114 while another end of the axle 124 is pivotally secured to a first end of the connector 122.

A second end of the connector 122 is pivotally secured to a respective end of connecting rod 126 which itself secured to a distal end of a piston 128 of an actuator 130.

As can be appreciated, actuation of actuator 130 will cause the piston 128 to rise or lower, and, via the various linkages created by the connecting rod 126, connectors 122 and pivot points or axels 124, cause the arms 114 to pivot about the axels or pivot points 112. This is in turn, via the linkages created by the axles or pivot points 116 and brackets 118, causes the upper door 24 to move vertically down or up. Specifically, retraction of the piston 128 causes the door 24 to open while extension of the piston 128 causes the door 24 to close.

With respect to the lower door 26, each lower door halves 26a and 26b can include another pneumatically actuated system, but located underneath or within a cavity in the door halve. This is shown in FIGS. 5 and 6 where pneumatic actuators 150 are depicted. Each actuator 150 is positioned beneath its lower door half and includes a piston 152 and a cylinder 154. When the door 26 is closed, the pistons 152 are retracted into their cylinders 154. To raise the door 26 into the closed position, the actuators are commanded to extend the pistons 152 and thus raised the door halves 26a and 26b.

Alternatively, the lower door 26 can be immovable, and the positioner can be configured with a pneumatic or hydraulic actuator so that the positioner can move the wall member 30 between raised and lowered positions. In the raised position, and with the upper door in a raised position, the positioner would be free to rotate the wall member 30 between its two operational positions. In the lowered position, the wall member and lower door 26 edges would be adjacent and one of the edges would be within a light blocking U-shaped or L-shaped channel as described above. Such liftable and rotatable pneumatic and hydraulic actuators are known or easily implemented using known technologies.

Finally, as illustrated best in FIGS. 5, 6 and 9, the flanges 106 cover the gaps between the doors 24 and 26 and the sides 16 and 20. The flanges 106 cover the gaps between the lower door halves 26a and 26b and the base of the positioner 28. As can be appreciated, these flanges are on both the exterior and interior sides of the doors so that the doors slide vertically within U-shaped or C-shaped channels. The flanges 106 can be the flanges of an 80/20® double flange linear bearing. While the profile of such a structural bearing is referred to as a T-slot profile, the channel in which the door edges slide can be considered U-shaped or C-shaped in cross section.

As can also be appreciated, the flanges 106 could be positioned on only one side of the doors, thereby creating L-shaped channels within which the doors slide.

The preceding description of the disclosed embodiments is provided to enable any person skilled in the art to make or use the present invention. Various modifications to these embodiments will be readily apparent to those skilled in the art, and the generic principles defined here may be applied to other embodiments without departing from the spirit or scope of the invention. Thus, the present invention is not intended to be limited to the embodiments shown here but is to be accorded the widest scope consistent with the following claims and the principles and novel features disclosed here.

The invention claimed is:

1. An enclosure with one side comprising:
   upper and lower vertically sliding doors that are movable between open and closed positions and having respective edges;
   a positioner rotatable around a vertical axis; and
   a positioner wall member carried on the positioner, the positioner wall member having a first edge, wherein,
      the positioner wall member is rotatable with the positioner from parallel to a plane of the vertically sliding door to out of the plane,
      the edges of the upper and lower vertically sliding doors and the positioner wall member having mating profiles, and
      the upper vertically sliding door, the lower vertically sliding door, and the positioner wall member form a light impervious surface when the upper and lower vertically sliding doors are in their closed positions.

2. The enclosure of claim 1, wherein the first edge or a second edge includes an L-shaped or a U-shaped channel into which the second edge or the first edge is received, respectively.

3. The enclosure of claim 1, further comprising at least one flange extending along a plane of one of the positioner wall member or the upper and lower vertically sliding doors and from the first edge of the positioner wall member or the upper and lower vertically sliding doors, respectively, so as to at least define an L-shaped channel,
   wherein,
      when the upper and lower vertically sliding doors are in the closed position, the edges of the upper and lower vertically sliding doors or the first edge of the positioner wall member, respectively, is received within the channel and the flange overlaps a gap between the edges of the upper and lower vertically sliding doors and the positioner wall member.

4. The enclosure of claim 3, wherein the flange extends along a plane of the positioner wall member and from the first edge of the positioner wall member.

5. The enclosure of claim 3, wherein the flange extends along a plane of the upper and lower vertically sliding doors and from an edge of the at least one vertically sliding door.

6. The enclosure of claim 1, comprising two flanges, each extending from a respective edge and along respective planes of opposites sides of the positioner wall member or the upper vertically sliding door or the lower vertically sliding door so as to define a U-shaped channel into which the edge of the upper vertically sliding door or the lower vertically sliding door or the positioner wall member, respectively is received, the flanges covering any gap between the edges.

7. The enclosure of claim 6, wherein the flanges extend along a plane of the positioner wall member and from an edge of the positioner wall member.

8. The enclosure of claim 6, wherein the flanges extend along a plane of the at least one vertically sliding door and from an edge of the at least one vertically sliding door.

9. The enclosure of claim 1, wherein the enclosure is Class 1 compliant as defined in the ANSI Z136 standards.

10. The enclosure of claim 1, further comprising two work stations on opposite sides of the positioner wall member.

11. The enclosure of claim 1, further comprising at least one physical barrier panel extending from a vertical edge of the one side of the enclosure.

12. The enclosure of claim 1, wherein:
   at least one flange extends from the first edge of the positioner wall member and is continuous about an periphery of the positioner wall member and defines at least a continuous L-shaped channel about the periphery of the positioner wall member, and
   edges of both the upper and lower vertically sliding doors are received within the channel when they are in the closed position.

13. The enclosure of claim 1, wherein:
   at least one flange extends from a lower edge of upper vertically sliding door and defines an L-shaped channel along the lower edge of the upper vertically sliding door, at least one flange extends from an upper edge of the lower vertically sliding door and defines an L-shaped channel along the upper edge of the lower vertically sliding door, and
   upper and lower edges of the positioner wall member are received in the L-shaped channel along the lower edge of the upper vertically sliding door and the L-shaped channel along the upper edge of the lower vertically sliding door, respectively.

14. The enclosure of claim 1, wherein:
   flanges extend from opposite sides of a lower edge of upper vertically sliding door and define a U-shaped channel along the lower edge of the upper vertically sliding door, flanges extend from opposite sides of an upper edge of the lower vertically sliding door and define a U-shaped channel along the upper edge of the lower vertically sliding door, and
   upper and lower edges of the positioner wall member are received in the U-shaped channel along the lower edge of the upper vertically sliding door and the U-shaped channel along the upper edge of the lower vertically sliding door, respectively, when the upper and lower vertically sliding doors are in the closed position.

15. An enclosure with one side, comprising:
   at least one vertically sliding door movable between open and closed positions and having a first edge;
   a positioner rotatable around a vertical axis; and
   a positioner wall member carried on the positioner, the positioner wall member also having a second edge, wherein,
      the positioner wall member is rotatable with the positioner from parallel to a plane of the vertically sliding door to out of the plane,
      the edges of the vertically sliding door and the positioner wall member having mating profiles, and the positioner wall member is movable in the vertical direction between raised and lowered positions, with the positioner wall member being rotatable about the vertical axis in the raised position and with the at least one vertically sliding door in the open position.

16. An enclosure with one side comprising:
upper and lower doors vertically movable between open and closed positions; and
a rotatable positioner with a positioner wall member, wherein,
the positioner wall member is rotatable with the positioner from parallel to a plane of the upper and lower doors to out of the plane,
the positioner wall member and the upper and lower doors form a light impervious surface when the upper and lower doors are in their closed positions,
one of the upper door or lower door, or the positioner wall member includes a channel into which an edge of the positioner wall member, or the upper door or the lower door is received such that edges of the upper and lower doors and the positioner wall member mate when the upper and lower doors are in the closed position, and
the enclosure is Class 1 compliant as defined in the ANSI Z136 standards.

17. The enclosure of claim 16, wherein the channel is U-shaped in cross section.

18. The enclosure of claim 16, wherein the channel is L-shaped in cross section.

19. The enclosure of claim 16, further comprising vertical channels within which the upper and lower doors slide.

* * * * *